US011829573B2

(12) United States Patent
Ono et al.

(10) Patent No.: US 11,829,573 B2
(45) Date of Patent: Nov. 28, 2023

(54) DYNAMIC USER INTERFACE PAGINATION OPERATION

(71) Applicant: International Business Machines Corporation, Armonk, NY (US)

(72) Inventors: Asako Ono, Setagaya (JP); Tohru Hasegawa, Tokyo (JP); Hiroaki Uetsuki, Machida (JP); Shunsuke Ishikawa, Shinjuku-ku (JP); Kenta Watanabe, Soka (JP); Yasuyuki Tominaga, Saitama (JP); Issei Yoshida, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/714,213

(22) Filed: Apr. 6, 2022

(65) Prior Publication Data

US 2022/0229538 A1     Jul. 21, 2022

Related U.S. Application Data

(63) Continuation of application No. 16/738,000, filed on Jan. 9, 2020, now Pat. No. 11,354,016.

(51) Int. Cl.
*G06F 3/04817* (2022.01)
*G06F 3/04886* (2022.01)
*G06F 3/0483* (2013.01)

(52) U.S. Cl.
CPC ........ *G06F 3/04817* (2013.01); *G06F 3/0483* (2013.01); *G06F 3/04886* (2013.01)

(58) Field of Classification Search
CPC . G06F 3/04817; G06F 3/0483; G06F 3/04886
See application file for complete search history.

(56) References Cited

U.S. PATENT DOCUMENTS 8,519,971 B1    8/2013   Mackraz
9,746,992 B1    8/2017   Kaplan
(Continued)

FOREIGN PATENT DOCUMENTS

| JP | 4364273 B2 | 11/2009 |
| JP | 2013239207 A | 11/2013 |
| WO | 2014190951 A1 | 12/2014 |

OTHER PUBLICATIONS

List of IBM Patents or Patent Applications Treated as Related, Filed Apr. 6, 2022, 2 pages.

*Primary Examiner* — Matthew A Eason
*Assistant Examiner* — Chayce R Bibbee
(74) *Attorney, Agent, or Firm* — Aaron N. Pontikos

(57) ABSTRACT

A computer-implemented method for graphical user interface element accessibility is disclosed. The computer-implemented method includes generating a graphical user interface element rendered on a web page as a virtual button displayed on a display screen of a device. The virtual button is not rendered on the webpage and includes an invocable function mapped to the graphical user interface element. The computer-implemented method further includes moving the virtual button along a periphery of the display screen of the device. A rate at which the virtual button moves along the periphery of the display screen of the device is dynamically modified based on a detected identity of a user of the device.

20 Claims, 8 Drawing Sheets

(56) References Cited

U.S. PATENT DOCUMENTS

| | | |
|---|---|---|
| 11,354,016 B2 * | 6/2022 | Ono .................... G06F 3/04886 |
| 2006/0075355 A1 | 4/2006 | Shiono |
| 2007/0157089 A1 | 7/2007 | Van Os |
| 2012/0032979 A1 | 2/2012 | Blow |
| 2014/0245176 A1 | 8/2014 | Murali |
| 2015/0331573 A1 | 11/2015 | Zhu |
| 2016/0078005 A1 | 3/2016 | Soós |
| 2017/0300205 A1 | 10/2017 | Villa |
| 2017/0357440 A1 | 12/2017 | Tse |
| 2021/0216192 A1 | 7/2021 | Ono |

* cited by examiner

DYNAMIC USER INTERFACE PAGINATION OPERATION

BACKGROUND

The present invention relates generally to the field of graphical user interfaces, and more particularly to pagination of electronic content displayed via graphical user interfaces.

A graphical user interface (GUI) is a form of user interface through which a user interacts with an electronic device, such as a computer, hand-held mobile device, or smart appliance through various icons, menus, and other visual indicators (i.e., graphical elements). Typically, user actions in a GUI are performed through direct manipulation of the graphical elements. Upon manipulating a graphical element, a corresponding action supported by the graphical element is performed. For example, selection of a graphical element results in a web browser loading a particular web page associated with the graphical element.

Electronic pagination, also known as "electronic paging," is the process of dividing or splitting the contents of an electronic dataset, such as a website, into discrete electronic pages. Pagination is oftentimes used in web applications to allow direct access to divided contents across a number of different pages. For example, pagination can be used to display a limited number of results on a search engine results page, or show a limited number of posts when viewing a forum thread. Access to divided contents is provided in the form of a user interface pattern (i.e., "pagination pattern" or "pagination design pattern"), which is to say a set of machine logic rules that specify how the contents are divided up (for example, first 5,000 words on first page, second 5,000 words on second page, . . . residual, leftover words on last page). These machine logic rules dictate how the contents are divided into separate pages, and therefore dictate how the user accesses the information (for example, dictate how many times a user has to hit a NEXT PAGE button to see a $5001^{st}$ post on a discussion thread at a web site).

SUMMARY

According to one embodiment of the present invention, a computer-implemented method for graphical user interface element accessibility is disclosed. The computer-implemented method includes generating a graphical user interface element rendered on a web page as a virtual button displayed on a display screen of a device. The virtual button is not rendered on the webpage and includes an invocable function mapped to the graphical user interface element. The computer-implemented method further includes moving the virtual button along a periphery of the display screen of the device. A rate at which the virtual button moves along the periphery of the display screen of the device is dynamically modified based on a detected identity of a user of the device.

According to another embodiment of the present invention, a computer program product for graphical user interface element accessibility is disclosed. The computer program product includes one or more computer readable storage media and program instructions stored on the one or more computer readable storage media. The program instructions include instructions to generate a graphical user interface element rendered on a web page as a virtual button displayed on a display screen of a device. The virtual button is not rendered on the webpage and includes an invocable function mapped to the graphical user interface element. The program instructions further include instructions to move the virtual button along a periphery of the display screen of the device. A rate at which the virtual button moves along the periphery of the display screen of the device is dynamically modified based on a detected identity of a user of the device.

According to another embodiment of the present invention, a computer system for graphical user interface element accessibility is disclosed. The computer system includes one or more computer system includes one or more computer processors, one or more computer readable storage media, and program instructions stored on the computer readable storage media for execution by at least one of the one or more processors. The program instructions include instructions to generate a graphical user interface element rendered on a web page as a virtual button displayed on a display screen of a device. The virtual button is not rendered on the webpage and includes an invocable function mapped to the graphical user interface element. The program instructions further include instructions to move the virtual button along a periphery of the display screen of the device. A rate at which the virtual button moves along the periphery of the display screen of the device is dynamically modified based on a detected identity of a user of the device.

DETAILED DESCRIPTION

Figure 1:
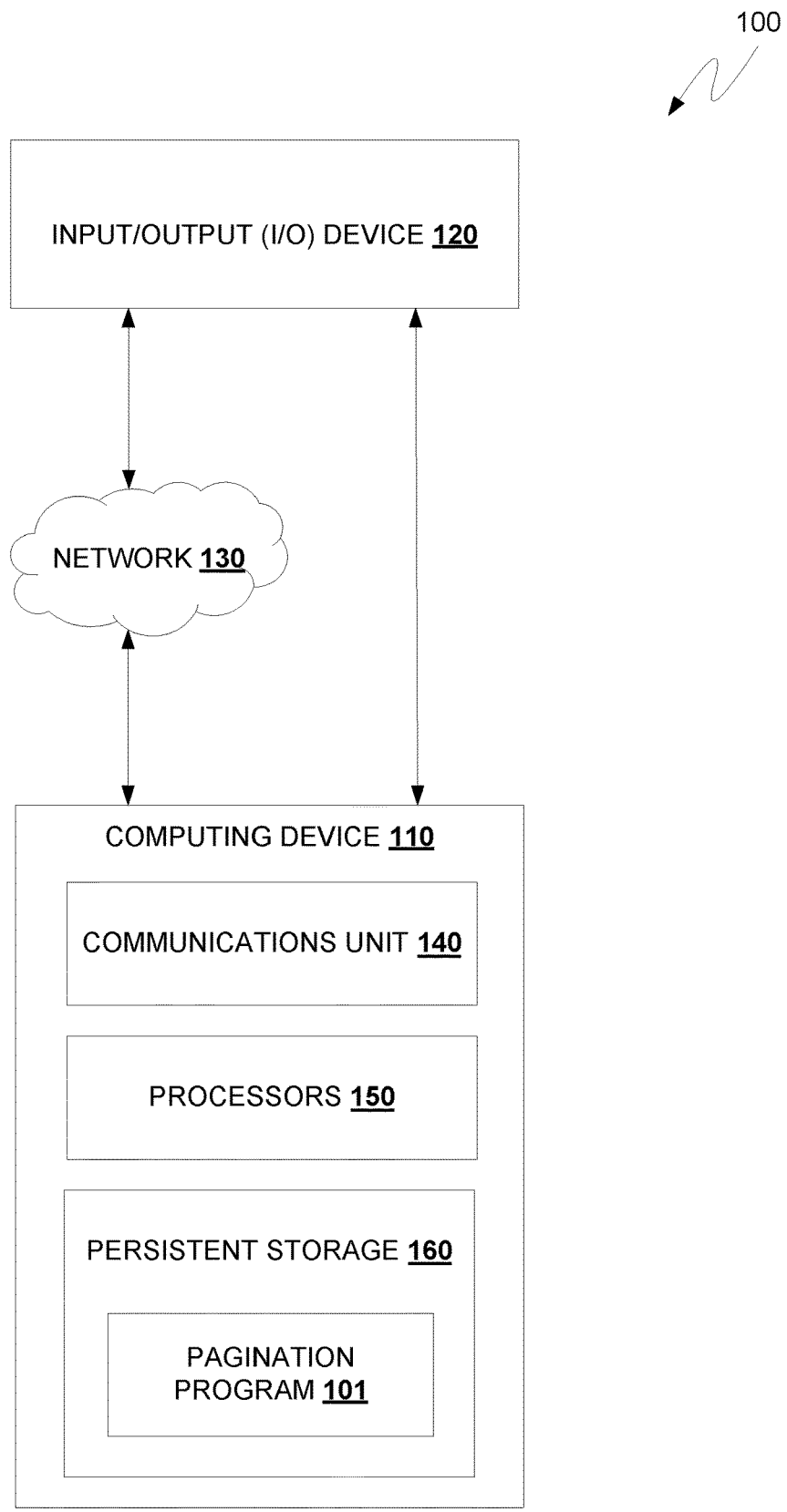
FIG. 1 is a functional block diagram of a computing system, generally designated 100, for generating a pagination design pattern as virtual buttons that move about the periphery of a display screen of a mobile device in accordance with at least one embodiment of the present invention.

In some instances, electronic pages can be a standard size based on the document setting of a word processor file, desktop publishing application file, or presentation software file. In other instances, electronic pages can be dynamic in size or content, such as in the case of hypertext markup language (HTML) pages. Pagination in web applications can be controlled by a code, which oftentimes orders dataset items based on one or more predefined parameters. For example, dataset items are ordered from newest to oldest. When dealing with large numbers of items, these codes ensure that page breaks are automatically set based on predetermined rules and algorithms. For example, pages breaks are automatically set based on cultural and semantic factors. These cultural and semantic factors are used to determine which page of contents each item belongs to in a pagination number list. In other words, various factors are used to determine whether or not items are related, in which case related items are placed on the same page, and unrelated items are placed on different pages.

Predetermined rules and algorithms can also be employed when dividing contents in search engines, where items can be arranged based on a number of different factors. For example, a search engine results page may list dataset items based on the regularity with which the search terms appear within websites and electronic documents. In another example, a search engine results page may list dataset items from most relevant to least relevant with respect to a search query.

Although pagination provides a user access to individual pages of a web application or search engine results, pagination can also provide a user with various other navigational information. For example, a pagination design pattern can indicate to a user the particular location or page that is currently being viewed within the total set of pages. In another example, a pagination design pattern can allow a user to determine the number of pages already navigated or otherwise skipped, the number of additional pages left to navigate, as well as the total number of navigable pages. In yet another example, visited page numbers can be distinguished from page numbers yet to be visited, thereby allowing users to realize which pages were previously accessed without having to revisit pages.

The primary purpose of pagination is to organize data in a meaningful way such that a user can easily navigate the contents of a website or search engine results among discrete web pages, rather than being presented with the entirety of the contents on a single web page (also known as infinite scrolling). However, embodiments of the present invention recognize several shortcomings in the accessibility of pagination design patterns, and in particular, the accessibility of pagination design patterns on mobile devices. In those instances where a user operates a mobile device with one hand, a user may not be able to reach a portion of the graphical elements of a pagination design pattern. Oftentimes, the pagination design pattern is centered at the bottom of the page. Depending on the orientation of the graphical elements with respect to a display screen, a user may be forced to change the manner in which the device is held (e.g., reposition the user's hand or operate the device with two hands) in order to select a particular graphical element included in the pagination design pattern. For example, when utilizing a search engine, such as Google®, a user who operates a mobile device with their left hand may not be able to reach the rightmost "o" with their thumb in the pagination design pattern "Goooooooooogle" corresponding to the tenth web page containing results returned from a search query.

Embodiments of the present invention further recognize that the inability to access graphical elements and/or need for adjustments to access graphical elements of pagination design patterns becomes increasingly problematic as the size of a mobile device increases. For example, a user operating an iPhone 6S (overall height of 5.44 inches and width of 2.64 inches) with their left hand may be able to reach the rightmost "o" with their thumb in the pagination design pattern "Goooooooooogle." However, the same user operating an iPhone 6 Plus (overall height of 6.22 inches and width of 3.06 inches) with their left hand may not be able to reach the rightmost "o" in the pagination design pattern "Goooooooooogle." Furthermore, the same user operating an iPad Mini 4 (overall height of 8 inches and width of 5.31 inches) with their left hand may not even be able to reach the fifth "o" from the left in the pagination design pattern "Goooooooooogle."

Similarly, embodiments of the present invention recognize that the inability to access graphical elements and/or need for adjustments to access graphical elements of a pagination design patterns becomes increasingly problematic as a user changes the orientation of a mobile device. For example, a user operating an iPhone 6S (overall height of 5.44 inches and width of 2.64 inches) with their left hand may be able to reach the rightmost "o" in the pagination design pattern "Goooooooooogle" when the device is detected as having a portrait orientation. However, the same user operating the same iPhone 6S with their left hand may not even be able to reach the fifth "o" from the left in the pagination design pattern "Goooooooooogle" when the device is detected as having a landscape orientation. This stems from the fact that when a change in orientation is detected, the mobile device can automatically rotate the screen to match the orientation of the device. Accordingly, rotation of the screen may result in the further shifting away of graphical elements included in a pagination design pattern from a user's reach.

Embodiments of the present invention improve upon the foregoing deficiencies of current methods and systems by increasing accessibility to graphical elements included in pagination design patterns. According to various embodiments of the present invention, a pagination design pattern is generated as one or more virtual buttons having links to web pages, wherein the virtual buttons move about the periphery of the display screen of a mobile device. For example, a virtual button corresponding to a graphical element of a pagination design pattern that contains a link to a particular search results page moves about the periphery of the display screen. In another example, a virtual button corresponding to a graphical element of a pagination design pattern that contains a link that points to a particular section of a web page moves about the periphery of the display screen.

Embodiments of the present invention recognize that by generating a pagination design pattern as virtual buttons that move about the periphery of the display screen of a mobile device, improved accessibility to all of the graphical elements included in the pagination design pattern is provided without requiring the physical layout of the content rendered on the display screen to be altered. Moreover, embodiments of the present invention recognize that by generating a pagination design pattern as virtual buttons that move about the periphery of the display screen of a mobile device, improved accessibility to all of the graphical elements included in the pagination design pattern is provided without obstructing the content rendered on the display screen. Additionally, embodiments of the present invention recognize that by generating a pagination design pattern as virtual buttons that move about the periphery of the display screen of a mobile device, improved accessibility to all of the graphical elements included in the pagination design pattern is provided without the need for detecting the location of a user's finger(s) with respect to the display screen and/or orientation of the device.

Although example embodiments as provided herein are generally directed towards the generation of pagination design patterns as virtual buttons that move about the periphery of a display screen of a mobile device, the present invention is not limited to pagination design patterns. Accordingly, the present invention can be practiced utilizing various other graphical elements as virtual buttons that move about the periphery of a display screen in order to improve accessibility to any type of graphical elements. Similarly, although example embodiments as provided herein are generally directed towards the generation of pagination design patterns as virtual buttons for accessing a search engine results page, the present invention is not limited to search engine results pages or web-based applications for that matter. Accordingly, the present invention can be practiced utilizing graphical elements of any type of application (web-based or desktop-based) or device as virtual buttons that move about the periphery of a display screen where the need to easily access or otherwise navigate through content or interact with a device exists.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a computing system, generally designated 100, for generating a pagination design pattern as virtual buttons that move about the periphery of a display screen of a mobile device in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes computing device 110, and input/output (I/O) device 120 interconnected over network 130. Computing device 110 includes communications unit 140, processors 150, and pagination program 101 stored on persistent storage 160. Computing device 110 is configured to operate pagination program 101 in accordance with an embodiment of the present invention.

In various embodiments of the present invention, computing device 110 can be a laptop computer, tablet computer, netbook computer, personal computer (PC), a desktop computer, a personal digital assistant (PDA), a smart phone, or any programmable electronic device capable of receiving, sending, and processing data. In some embodiments, computing device can be a standalone device, a management server, a web server, a mobile device, or any other electronic device or computing system capable of receiving, sending, and processing data. In other embodiments, computing device 110 can represent a server computing system utilizing multiple computers as a server system, such as in a cloud computing environment. In an embodiment, computing device 110 can represent a computing system utilizing clustered computers and components (e.g. database server computers, application server computers, etc.) that act as a single pool of seamless resources when accessed within computing system 100. In general, computing device 110 can represent any programmable electronic device or combination of programmable electronic devices capable of executing machine readable program instructions and communicating with I/O device 120, and other devices (not depicted) via a network, such as network 130.

In some embodiments, I/O device 120 is located on a computing device (not depicted), such as a mobile device, that is remotely located from computing device 110. In these embodiments, I/O device 120 is part of a device that includes mobile application software that provides an interface between the device and pagination program 101 running on computing device 110. In other embodiments, input/output device 120 is physically located or connected to computing device 110. Computing device 110 may include internal and external hardware components, as depicted and described in further detail with respect to FIG. 4.

Generally, I/O device 120 is a user interface that provides an interface between I/O device 120 and computing device 110. In various embodiments, I/O device 120 is a graphical user interface (GUI) or a web user interface (WUI) and can display text, documents, web browser windows, user options, application interfaces, and instructions for operation, and includes the information (such a graphic, text, and sound) that a program presents to a user and the control sequences the user employs to control the program. In some embodiments, I/O device 120 is a touchscreen. As used herein, the terms "touchscreen", "touchscreen display", and "display screen" shall refer to a computing device display which can sense the location of a finger or touch to a display surface. One of ordinary skill in the art will appreciate that touchscreens are well known and widely used in mobile devices. Touchscreens detect or sense a touch (or press) by a finger or other instrument and interpret that touch as an input to the mobile device. The sensing of a touch and the input data provided by the touchscreen is referred herein as a "touch event". Touch event data provided by a touchscreen to a device processor can include, but is not limited, to the location, area, and shape of the touchscreen surface touched by a user's fingertip. Sensing the touch location and/or shape of a fingertip on a touchscreen surface can be accomplished using any known technologies. For example, touchscreen displays may include pressure sensing surfaces, capacitance-sensing surfaces, and induction-sensing surfaces, all of which directly detect a user's touch.

In various embodiments, I/O device 120 allows a user to perform various input operations, including, but not limited to, hovering, selecting, dragging, and swiping. The descriptions of input operations are used as examples of input device control for managing the use and application of graphical user interface elements. As used herein, the terms "graphical user interface elements," "GUI elements," or "graphical elements" shall refer to those elements of a GUI that allow a user to interact with an electronic device and the contents displayed thereon. Examples of graphical elements of a GUI include, but are not limited to windows, menus, icons, tabs, controls or widgets (i.e., software components that a user interacts with through direct manipulation to read or edit information about an application), interaction elements (i.e., interface object that represent the state of an ongoing operation or transformation, either as visual reminders of user intent (e.g., pointer or insertion point), or as places where the user may interact (e.g., cursor), pagination design patterns, and virtual buttons. It should be appreciated that although examples presented herein may refer to the use of one type of input device, embodiments of the present invention are not limited by the type of input device used or the designation of the particular input operations used while interacting with a graphical user interface.

Network 130 can be, for example, a telecommunications network, a local area network (LAN), a wide area network (WAN), such as the Internet, or a combination of the three, and can include wired, wireless, or fiber optic connections. Network 130 may include one or more wired and/or wireless networks that are capable of receiving and transmitting data, voice, and/or video signals, including multimedia signals that include voice, data, and video information. In general, network 130 may be any combination of connections and protocols that will support communications between computing device 110, I/O device 120, and other computing devices (not shown) within computing system 100.

Communications unit 140 provides communications between computing device 110, I/O device 120, and other data processing systems (not shown) by connection to network 130. Communications unit 140 connects to network 130 using one or more network interface cards, or through the use of either or both physical and wireless communications links as described further in the discussion of FIG. 4.

Processor(s) 150 controls operational activity of computing device 110, including application programs, such as pagination program 101. Processor(s) 150 is described in greater detail in the discussion of FIG. 4.

Figure 2A:
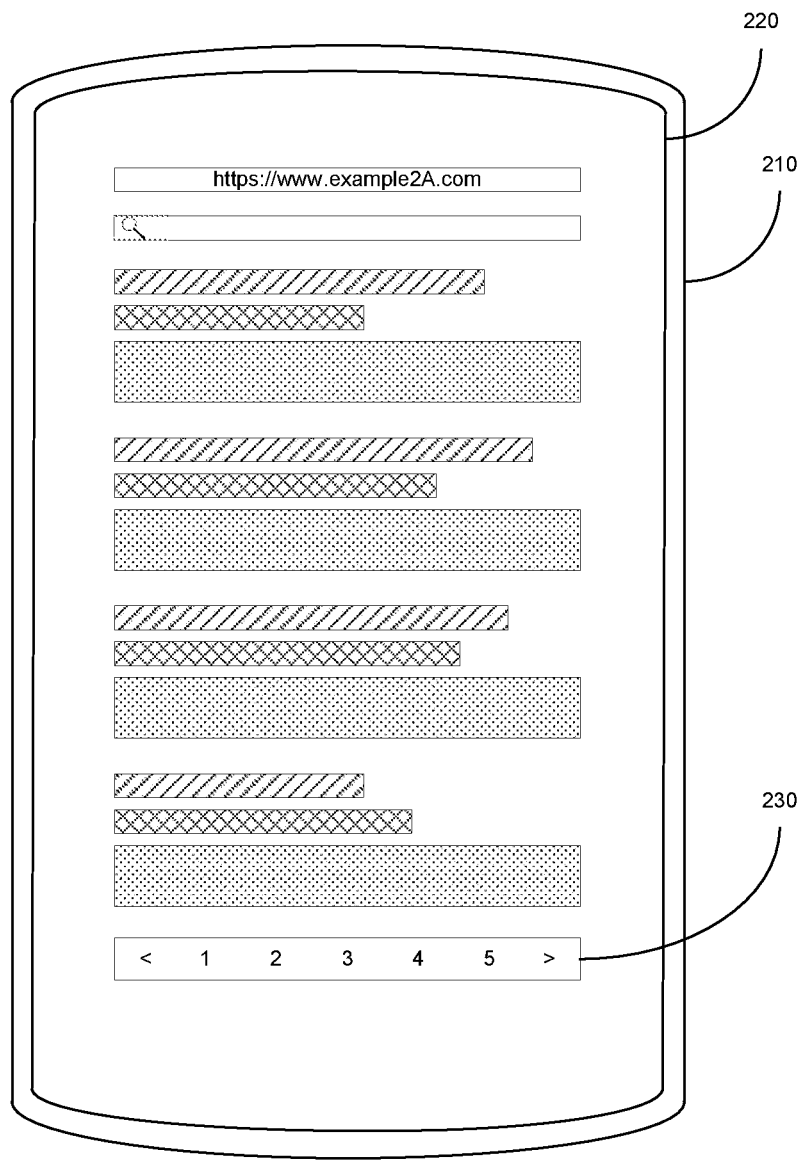
FIG. 2A depicts an exemplary pagination design pattern 230 displayed via a touch screen 220 of a mobile device 210 in accordance with at least one embodiment of the present invention.

FIG. 2A depicts an exemplary pagination design pattern 230 displayed via a touch screen 220 of a mobile device 210 in accordance with at least one embodiment of the present invention. As depicted in FIG. 2A, pagination design pattern 230 is rendered in a static position on a search engine results web page. Pagination design pattern 230 includes the following graphic elements: HTML back button "<", results page "1", results page "2", results page "3", results page "4", results page "5", and HTML forward button ">". HTML back button "<" allows a user to move back to the previous search results page. For example, if a user is currently viewing results page "4" and selects HTML back button "<", the user is redirected to results page "3". Similarly, pagination design pattern 230 includes HTML forward button ">". HTML forward button ">" allows a user to move forward to a subsequent search results page. For example, if a user is currently viewing results page "2" and selects HTML forward button ">", the user is redirected to results page "3". Results pages 1-5 include links to search results web pages, respectively. Accordingly, selection of any of the results pages 1-5 results in the redirection of a user to a search results web page linked to a particular results page.

Figure 2B:
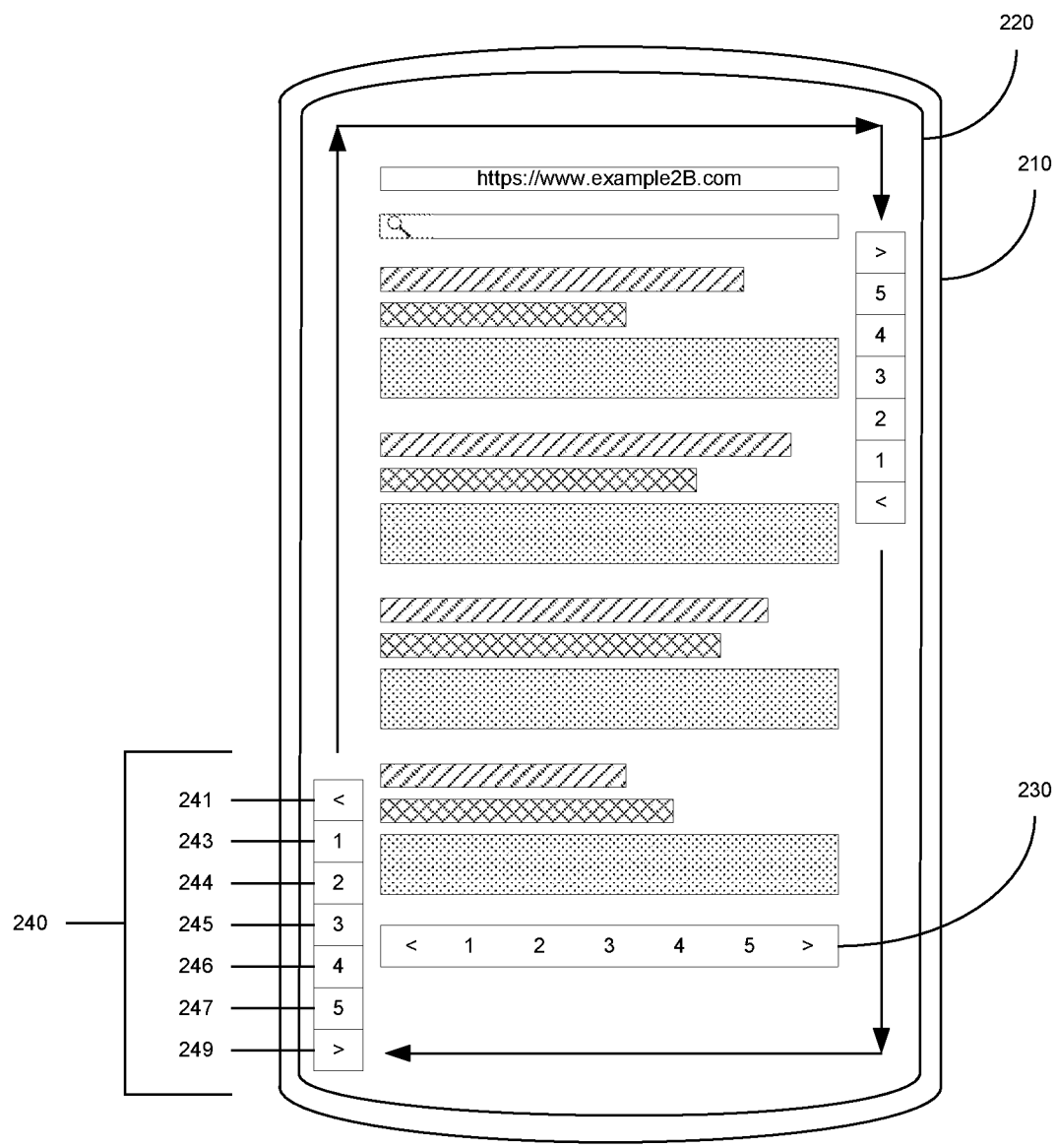
FIG. 2B depicts exemplary pagination design pattern 230 and pagination design pattern 240 displayed via a touch screen 220 of a mobile device 210 in accordance with at least one embodiment of the present invention.

FIG. 2B depicts exemplary pagination design pattern 230 and pagination design pattern 240 displayed via a touch screen 220 of a mobile device 210 in accordance with at least one embodiment of the present invention. As depicted in FIG. 2B, pagination design pattern 230 is rendered in a static position on a search web page and includes the following graphical elements, which are similar to those depicted in Figure: HTML back button "<", results page "1", results page "2", results page "3", results page "4", results page "5", and HTML forward button ">".

Pagination design pattern 240 includes HTML back button 241, results page "1" 243, results page "2" 244, results page "3" 245, results page "4" 246, results page "5" 247, and HTML forward button 249, which are all virtual buttons that circulate about the periphery of touch screen 220. HTML back button 241 allows a user to move back to the previous search results page on a web browser. For example, if a user is currently viewing results page "4" 246 and selects HTML back button 241, the user is redirected to results page "3" 245 rendered on the web browser. Similarly, pagination design pattern 240 includes HTML forward button 249. HTML forward button 249 allows a user to move forward to a subsequent search results page on the web browser. For example, if a user is currently viewing results page "2" 244 and selects HTML forward button 249, the user is redirected to results page "3" 245 rendered on the web browser. Results pages 243-247 include links to search results web pages, respectively.

As further depicted in FIG. 2B, pagination design pattern 240 is generated as a series of virtual buttons that circulate about the periphery of touch screen 220 of mobile device 210 in accordance with at least one embodiment of the present invention. It should be appreciated that unlike pagination design pattern 230, pagination design pattern 240 is not rendered in a static position on the search results web page. As depicted in FIG. 2B, pagination design pattern 240 circulates clockwise about the periphery of touch screen 220. However, it should be appreciated that, although not depicted, pagination design pattern 240 can also circulate counterclockwise about the periphery of touch screen 220.

Figure 2C:
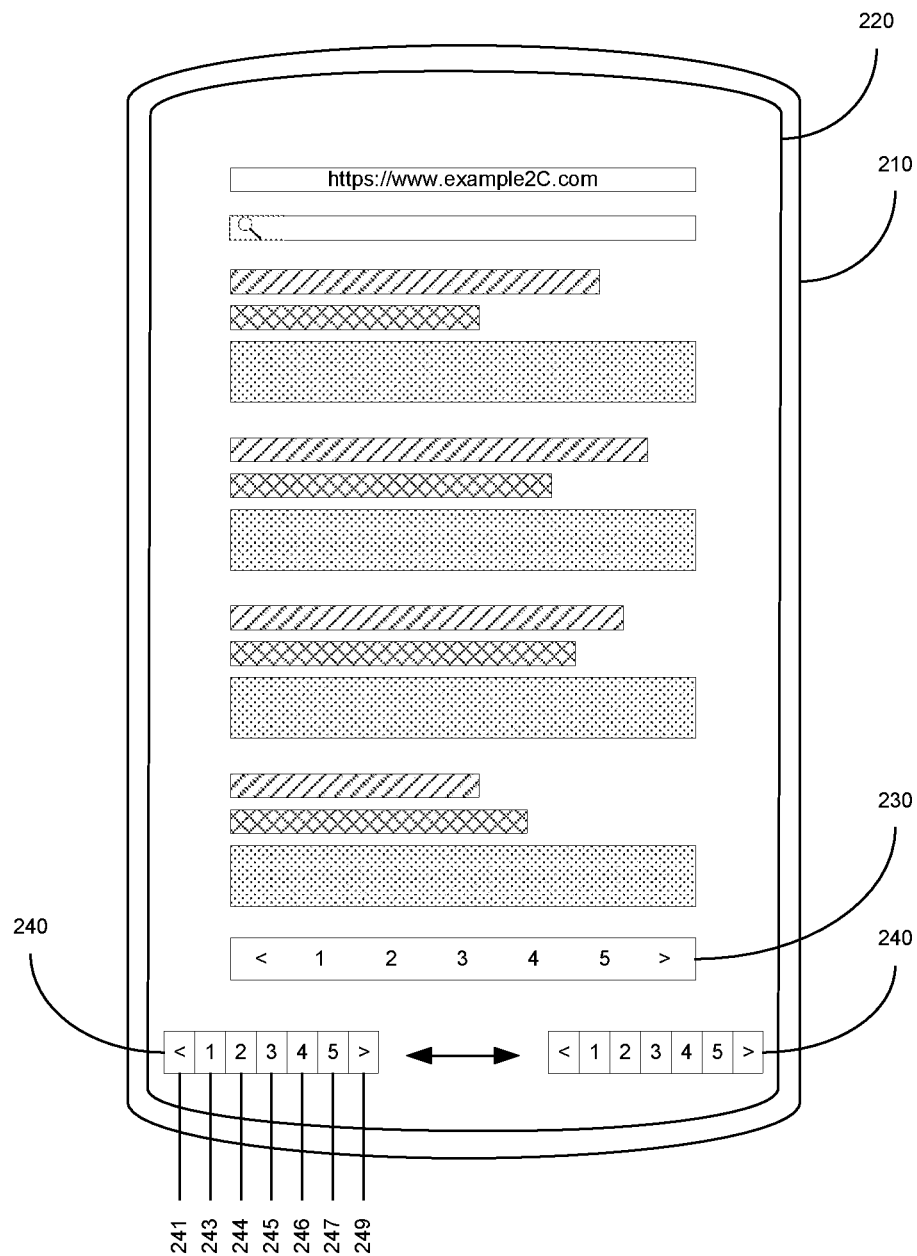
FIG. 2C depicts exemplary pagination design pattern 230 and pagination design pattern 240 displayed via a touch screen 220 of a mobile device 210 in accordance with at least one embodiment of the present invention.

FIG. 2C depicts exemplary pagination design pattern 230 and pagination design pattern 240 displayed via a touch screen 220 of a mobile device 210 in accordance with at least one embodiment of the present invention. As depicted in FIG. 2C, pagination design pattern 230 is rendered in a static position on a search web page and includes the following graphical elements, which are similar to those depicted in FIGS. 2A and 2B: HTML back button "<", results page "1", results page "2", results page "3", results page "4", results page "5", and HTML forward button ">". Pagination design pattern 240 includes the following series of virtual buttons, which are similar to depicted in FIG. 2B: HTML back button 241, results page "1" 243, results page "2" 244, results page "3" 245, results page "4" 246, results page "5" 247, and HTML forward button 249, which are all virtual buttons that circulate about the periphery of touch screen 220.

As further depicted in FIG. 2C, pagination design pattern 240 is generated as a series of virtual buttons that oscillate along a periphery of touch screen 220 of mobile device 210 in accordance with at least one embodiment of the present invention. It should be appreciated that unlike pagination design pattern 230, pagination design pattern 240 is not rendered on the search results web page displayed via touch screen 220. As depicted in FIG. 2C, pagination design pattern 240 oscillates laterally along the bottom periphery of touch screen 220. However, it should be appreciated that, although not depicted, pagination design pattern 240 can also oscillate laterally at any vertical position of a display screen (e.g., along the periphery of the top, or in the middle, of touch screen 220. Similarly, it should be appreciated that, although not depicted, pagination design pattern 240 can oscillate vertically along the periphery of either side, or at any lateral position, of touch screen 220.

Figure 3:
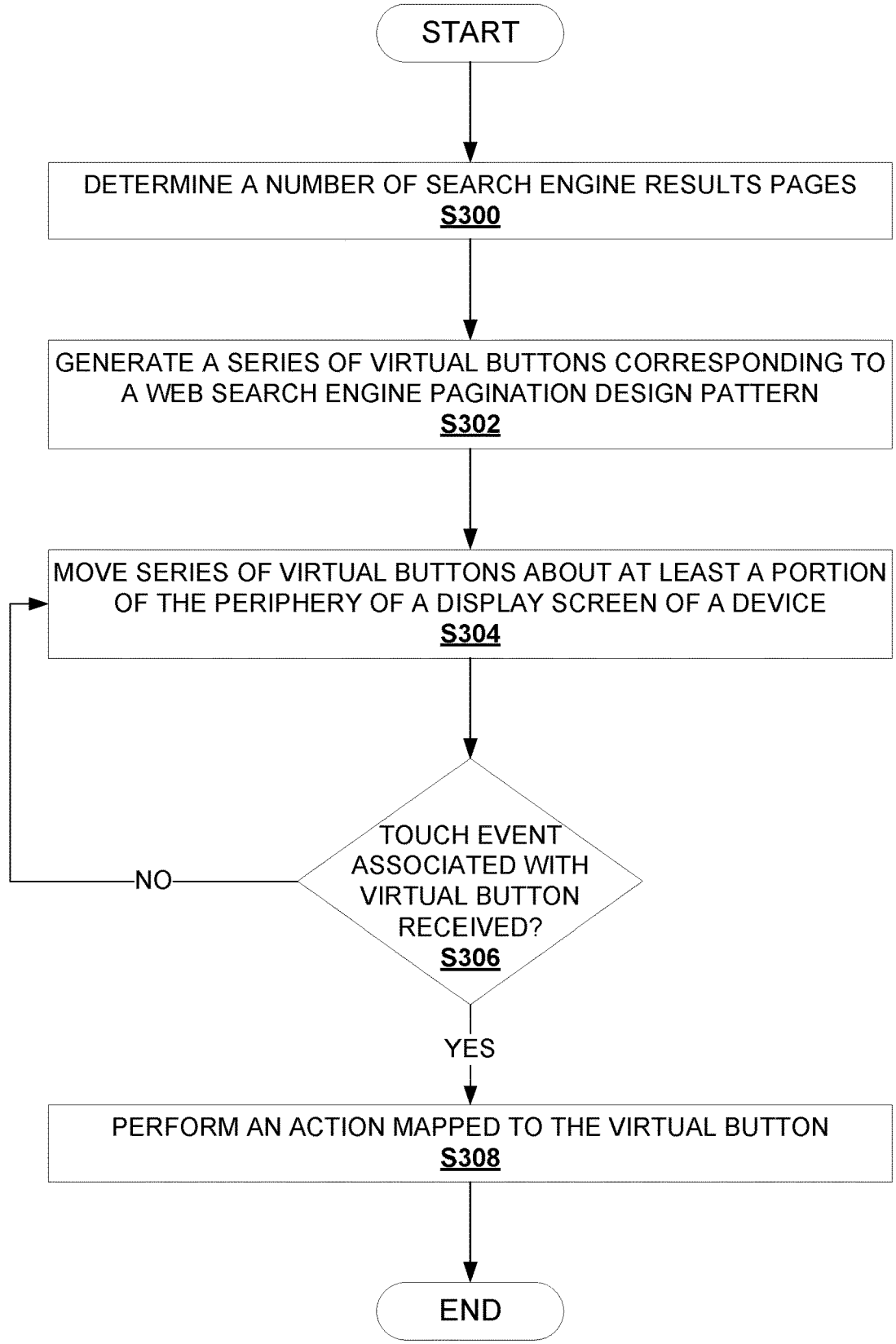
FIG. 3 is a flow chart diagram depicting operational steps for generating a pagination design pattern as a series of virtual buttons that move about the periphery of a display screen in accordance with at least one embodiment of the invention.

FIG. 3 is a flow chart diagram depicting operational steps for executing a paging operation as virtual buttons that dynamically move about a periphery of a display screen. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S300, pagination program 101 determines a number of search engine results pages (SERP) returned responsive to a search query. One of ordinary skill in the art will appreciate that the SERP are the pages displayed by a search engine in response to a search query. Generally, results are ranked by relevance to the query and include a title, a link that points to the actual page on the web, and a short description showing where the keywords have matched content within the page. The number of results per page can be varied based on the number of results per page indicated in the pagination settings. For example, the default setting for the number of results returned per page may be set to 20 results. However, a user may change the default setting to increase or decrease the number of results returned per page.

In various embodiments, pagination program 101 determines a number of SERP based, at least in part, on dividing the total number of results returned by the number of results returned per page. Typically, the total number of results returned and/or and the amount of time required to generate the results ("about 100,000 results (0.86 seconds")") is displayed either at the top or the bottom of each results page. For example, if it is determined that 100,000 results were returned in response to the search query "Watson IBM" and the number of results returned per page is set to 20 results, then the number of SERP would be 5,000.

At step S302, pagination program 101 generates virtual buttons having functionality consistent with a web search engine pagination design pattern. In various embodiments, a virtual button is generated for each search results page returned by a web search engine responsive to a search query. As used herein, the terms "virtual button", "virtual softkey", or "virtual key" shall refer to a button or key on a touchscreen device which has user programmable functions. It should be appreciated that the virtual buttons generated in accordance with embodiments of the present invention are logically distinct from the graphical elements associated with a pagination design pattern rendered via a web page running as a mobile application on a mobile device.

In some embodiments, pagination program 101 identifies a hyperlink to a web page associated with a graphical element of the pagination design pattern and adds the hyperlink to a virtual button in the series of virtual buttons corresponding to the graphical element. For example, the following pagination design pattern <12345> is rendered on a web page, in which each graphical element includes a function (e.g., link) to a corresponding search engine results page. Accordingly, pagination program 101 may add the same hyperlink to a virtual button corresponding to a graphical element in the pagination design pattern <12345> rendered on the web page. For example, if the fourth selectable graphical element "3" from the left of a pagination design pattern contains a link to the third search engine results page, then pagination program 101 generates a virtual button substantially similar in appearance (e.g., "3") having a link to the same search engine results page as the link associated with fourth selectable graphical element of the pagination design pattern rendered on a web page.

In an embodiment, pagination program 101 adds an invocable function to virtual buttons in the series of virtual buttons. For example, selecting a virtual button results in a function invocation (i.e., call) to a graphical element of a pagination design pattern rendered on a web page. For example, if the third numbered graphical element "3" from the left of the pagination design pattern <12345> contains a link to the third search engine results page, then pagination program 101 may generate a virtual button substantially similar in appearance (e.g., "3"). However the virtual button "3" does not contain a similar function (i.e., link) to the third search engine results page. Rather, selecting the virtual button "3" results in a function invocation (e.g., selection of the graphical element "3" of the pagination design pattern rendered on the web page). Accordingly, if graphical element "3" of the pagination design pattern rendered on the webpage is linked to the third search engine results page, then selection of the virtual button "3" will ultimately result in the user automatically being redirected to the third search engine results page via selection of the graphical element "3" of the pagination design pattern rendered on the web page.

In some embodiments, pagination program 101 automatically generates a series of virtual buttons based on pre-configured settings. In an embodiment, a series of virtual buttons are generated in response to identifying a pagination design pattern rendered on a web page. In an embodiment, a series of virtual buttons are generated in response to a search results page having a pagination design pattern being loaded on a web browser above a predetermined threshold amount of time. For example, a series of virtual buttons are generated if a search results page having an identifiable pagination design pattern has been loaded on a web browser for longer than 5 seconds.

In some embodiments, pagination program 101 automatically generates a series of virtual buttons in response to receiving a "trigger event" from a user. In an embodiment, a series of virtual buttons are generated in response to detecting a touch event within a predetermined area of a pagination design pattern for at least a predetermined period of time. For example, a series of virtual buttons are automatically generated in response to receiving a "touch event" associated with a non-selectable region of a web page positionally located to the left of the pagination design pattern for a duration of 3 seconds. In an embodiment, a series of virtual buttons are automatically generated in response to detecting a "touch event" on a portion of a pagination design pattern for at least a predetermined duration of time (e.g., 2 seconds).

At step S304, pagination program 101 moves the series of virtual buttons about at least a portion of the periphery of a display screen of a mobile device. In some embodiments, a series of virtual buttons corresponding to graphical elements of a pagination design pattern rendered on a web page circulate about the periphery of the display screen of a mobile device, thereby allowing a user of the mobile device to reach all of the graphical elements associated with the pagination design pattern without altering the manner in which the device is being held. The manner in which the series of virtual buttons circulate (e.g., rate or speed of circulation, direction of circulation, etc.) may be determined based on pre-configured user settings, default system settings, or learned over time.

In some embodiments, a series of virtual buttons circulate about the periphery of the display screen at a constant rate or speed. In an embodiment, the rate or speed at which virtual buttons circulate about the periphery of the display screen is based on pre-configured settings. For example, a user can select a rate or speed (slow, medium, or fast) at which the virtual buttons circulate. In an embodiment, the rate or speed at which virtual buttons circulate about the periphery of the display screen is dynamically modified based on a detected identity of a user of the mobile device. For example, based on detecting an identity of a user (e.g., via facial recognition, voice recognition, or fingerprint recognition), pagination program 101 automatically adjusts the rate or speed at which virtual buttons circulate based on pre-configured user settings associated with the identified user.

In an embodiment, the optimal rate or speed at which virtual buttons are configured to circulate about the periphery of a display screen for a particular user is learned over time. For example, pagination program 101 determines that at a particular speed of circulation, a selection error (i.e., selecting the wrong or unintended virtual button) for a particular user is above an acceptable threshold (e.g., incorrect virtual buttons are selected greater than 30% of the time). An incorrect selection of a virtual button may be determined, for example, based on identifying a selection of an "HTML back button" within a threshold amount of time subsequent to the selection of a virtual button. In another example, an incorrect selection of a virtual button may be determined, for example, based on a selection of a second virtual button after selection of a first virtual button within a predetermined amount of time (e.g., 2 seconds). Accordingly, based on determining a selection error above the acceptable threshold, pagination program 101 may decrease the speed at which the series of virtual buttons circulate about a periphery of a display screen.

In another example, pagination program 101 determines that at a particular speed of circulation, a selection error (i.e., selecting the wrong or unintended virtual button) is below an acceptable threshold level (e.g., incorrect virtual buttons are selected less than 10% of the time). This may be determined, for example, based on a user remaining on a particular search engine results page above a threshold period of time subsequent to a selection of a virtual button. Accordingly, based on determining a selection error below the acceptable threshold level, pagination program 101 may increase the speed at which the series of virtual buttons circulate about the periphery of a display screen.

In some embodiments, a series of virtual buttons do not continuously circulate about the periphery of the display screen at a constant rate or speed. Rather, the series of virtual buttons circulate intermittently, thereby allowing a user to select a virtual button in a static state. For example, after moving a predetermined distance about the periphery of the display screen, circulation of the series of virtual buttons is paused for a predetermined period of time. After the predetermined period of time has elapsed, the series of virtual buttons continue to move in the same direction about the periphery of the display screen. In some embodiments, the duration of time at which circulation is paused is based on pre-configured user settings. For example, a user can select a duration of time (1 second, 3 seconds, or 5 seconds) at which the series of virtual buttons remain in a static state during circulation about the periphery of the display screen. In some embodiments, the location(s) at which circulation of a series of virtual buttons is paused is based on pre-configured user settings. For example, a user can select the location(s) on the display screen in which circulation of the series of virtual buttons should be paused based on which hand and the particular holding style the user operates a mobile device. In an embodiment, preconfiguring can include the user performing a "touch event" on the screen to calibrate where virtual buttons should intermittently pause from circulation.

In an embodiment, the direction of circulation of the series of virtual buttons around the periphery of the display screen is determined based, at least in part, on the style in which user holds or otherwise operates a mobile device, and which hand a user holds or otherwise operates the mobile device. For example, if a user holds a mobile device in their left hand and selects graphical elements with their left thumb, then pagination program 101 may cause the series of virtual buttons to circulate clockwise around the periphery of the display screen. This stems from the fact that since the user is unlikely able to reach the rightmost graphical elements of the pagination design pattern, the virtual buttons corresponding to the rightmost graphical elements of the pagination design pattern will be reachable or selectable by a user's left thumb moving clockwise from the bottom of the display screen faster than if the virtual buttons circulate counterclockwise from the bottom of the display screen.

In another example, if a user holds a mobile device in their right hand and selects graphical elements with their right thumb, then pagination program 101 may cause the series of virtual buttons to circulate counterclockwise around the periphery of the display screen. This stems from the fact that since the user is unlikely able to reach the leftmost graphical elements of the pagination design pattern, the virtual buttons corresponding to the leftmost graphical elements of the pagination design pattern will be reachable or selectable by a user's right thumb moving counterclockwise from the bottom of the display screen faster than if the virtual buttons circulate clockwise from the bottom of the display screen.

In some embodiments, a series of virtual buttons corresponding to a pagination design pattern do not circulate about the periphery of a display screen of a mobile device. Rather, the series of virtual buttons oscillate along a portion of the periphery of display screen of a mobile device, thereby allowing a user of the mobile device to reach all of the graphical elements included in the pagination design pattern without altering the manner in which the device is being held. In some embodiments, the series of virtual buttons oscillate vertically along a periphery of the display screen. In other embodiments, the virtual buttons oscillate horizontally along a periphery of the display screen. The manner in which virtual buttons oscillate (e.g., vertically or horizontally, speed or rate of oscillation, etc.) may be determined based on pre-configured user settings, default system settings, or learned over time.

In some embodiments, the series of virtual buttons oscillate along the periphery of the display screen at a constant rate or speed. In an embodiment, the rate or speed at which a series of virtual buttons oscillate along the periphery of the display screen is based on pre-configured user settings. For example, a user can select a rate or speed (slow, medium, or fast) at which the virtual buttons oscillate. In another example, a user can select the direction of oscillation (horizontally or vertically) in which the virtual button oscillate.

In an embodiment, at least one of the rate or speed, and the direction at which a series of virtual buttons oscillate along the periphery of a display screen is dynamically modified based on detected identity of a user of a mobile device. For example, based on detecting an identity of a user (e.g., via facial recognition, voice recognition, or fingerprint recognition), pagination program 101 automatically adjusts the rate or speed at which the series of virtual buttons oscillate based on pre-configured user settings associated with the identified user. In another example, based on detecting an identity of a user (e.g., via facial recognition, voice recognition, or fingerprint recognition), pagination program 101 automatically adjusts the direction of oscillation (horizontally or vertically) based on pre-configured user settings associated with the identified user.

In an embodiment, at least one of the rate or speed, and direction at which a series of virtual buttons are configured to oscillate along the periphery of the display screen for a particular user is learned over time. For example, pagination program 101 determines that at a particular speed of oscillation, a selection error (i.e., selecting the wrong or unintended virtual button) for a particular user is above an acceptable threshold level (e.g., incorrect virtual buttons are selected greater than 30% of the time). An incorrect selection of a virtual button may be determined, for example, based on identifying a selection of a "HTML back button" within a threshold amount of time subsequent to the selection of a virtual button. In another example, an incorrect selection of a virtual button may be determined, for example, based on a selection of a second virtual button after selection of a first virtual button within a predetermined amount of time (e.g., 2 seconds). Accordingly, based on determining a selection error above the acceptable threshold level, pagination program 101 may decrease the speed at which the series of virtual buttons oscillate along a periphery of a display screen.

In another example, pagination program 101 determines that at a particular speed of oscillation, a selection error (i.e., selecting the wrong or unintended virtual button) is below an acceptable threshold level (e.g., incorrect virtual buttons are selected less than 10% of the time). This may be determined, for example, based on a user remaining on a particular search engine results page above a threshold period of time subsequent to a selection of a virtual button. Accordingly, based on determining a selection error below the acceptable threshold level, pagination program 101 may increase the speed at which the series of virtual buttons oscillate along the periphery of a display screen.

In some embodiments, a series of virtual buttons do not continuously oscillate along the periphery of the display screen at a constant rate or speed. Rather, the series of virtual buttons oscillate intermittently, thereby allowing a user to select a virtual button in a static state. For example, after moving a predetermined distance along the periphery of the display screen, oscillation of the series of virtual buttons is paused for a predetermined period of time. After the predetermined period of time has elapsed, the series of virtual buttons continue to oscillate along the periphery of the display screen.

In some embodiments, the duration of time at which circulation is paused is based on pre-configured user settings. For example, a user can select a duration of time (1 second, 3 seconds, or 5 seconds) at which the series of virtual buttons remain in a static state during oscillation along the periphery of the display screen. In some embodiments, the location(s) at which oscillation of the series of virtual buttons is paused is based on pre-configured user settings. For example, a user can select the location(s) on the display screen in which oscillation of virtual buttons should be paused based on which hand and the particular holding style the user operates a mobile device. In an embodiment, pre-configuring can include the user performing a "touch event" on the screen to calibrate where a series of virtual buttons should intermittently pause from oscillation.

In an embodiment, the direction of oscillation of a series of virtual buttons along the periphery of the display screen is determined based, at least in part, on the style in which user holds or otherwise operates a mobile device, the orientation of the mobile device (e.g., portrait vs. landscape), and which hand a user holds or otherwise operates the mobile device. For example, if a user holds a mobile device in their left hand and selects graphical elements with their left thumb, then pagination program 101 may cause the series of virtual buttons to oscillate from left to right along at least a portion of the periphery of the bottom of the display screen. This stems from the fact that since the user is unlikely able to reach the rightmost graphical elements of the pagination design pattern, the virtual buttons corresponding to the rightmost graphical elements of the pagination design pattern will be reachable or selectable by a user's left thumb moving left to right along the bottom of the display screen faster than if the virtual buttons begin oscillating right to left along the bottom of the display screen.

In another example, if a user holds a mobile device in their right hand and selects graphical elements with their right thumb, then pagination program 101 may cause the series of virtual buttons to oscillate beginning from left to right along at least a portion of the periphery of the bottom side of the display screen. This stems from the fact that since the user is unlikely able to reach the leftmost graphical elements of the pagination design pattern, the virtual buttons corresponding to the leftmost graphical elements of the pagination design pattern will be reachable or selectable by a user's right thumb moving right to left along the bottom of the display screen faster than if the virtual buttons being oscillating left to right along the bottom of the display screen.

At decision step S306, pagination program 101 determines whether a "touch event" associated with a virtual button is received. If a "touch event" associated with a virtual button is not received (decision step S306 "NO" branch), pagination program 101 continues to move the virtual buttons about at least a portion of the periphery of a display screen and returns to step S304. If a "touch event" associated with a virtual button is received (decision step S306 "YES" branch), pagination program 101 proceeds to step S308.

At step S308, pagination program 101 performs an action mapped to the virtual button in response to receiving the touch event relative to the virtual button. In those embodiments where virtual buttons include a link to a web page, pagination program 101 redirects the user to a web page linked to the virtual button in response to receiving a touch event relative to the virtual button containing the link. In those embodiments where virtual buttons invoke a function associated with a graphical element of a pagination design pattern, pagination program 101 invokes a function associated with the virtual button. For example, in response to receiving a touch event relative to the third "o" of a set of virtual buttons corresponding to the pagination design pattern "Gooooogle", pagination program 101 selects the third "o" in the pagination design pattern "Gooooogle" rendered on the web page. Accordingly, the selection of the third "o" in the set of virtual buttons will ultimately result in the user being redirected to the third page of results.

In some embodiments, pagination program 101 removes the series of virtual buttons from the display screen in response to performing an action mapped to a virtual button. In other embodiments, in response to performing an action mapped to a virtual button, pagination program 101 generates new virtual buttons to match those graphical elements of the pagination design pattern rendered on a web browser. For example, after selecting the virtual button "5" in the series of virtual buttons "<12345>," the user is redirected to the 5$^{th}$ search results page linked to the virtual button "5". On the 5$^{th}$ search engine results page, the pagination design pattern "<6 7 8 9 10>" is rendered on the web page. Accordingly, pagination program 101 may generate a new series of virtual buttons—"<6 7 8 9 10>" that match the pagination design pattern "<6 7 8 9 10>" rendered on the web page.

Figure 4:
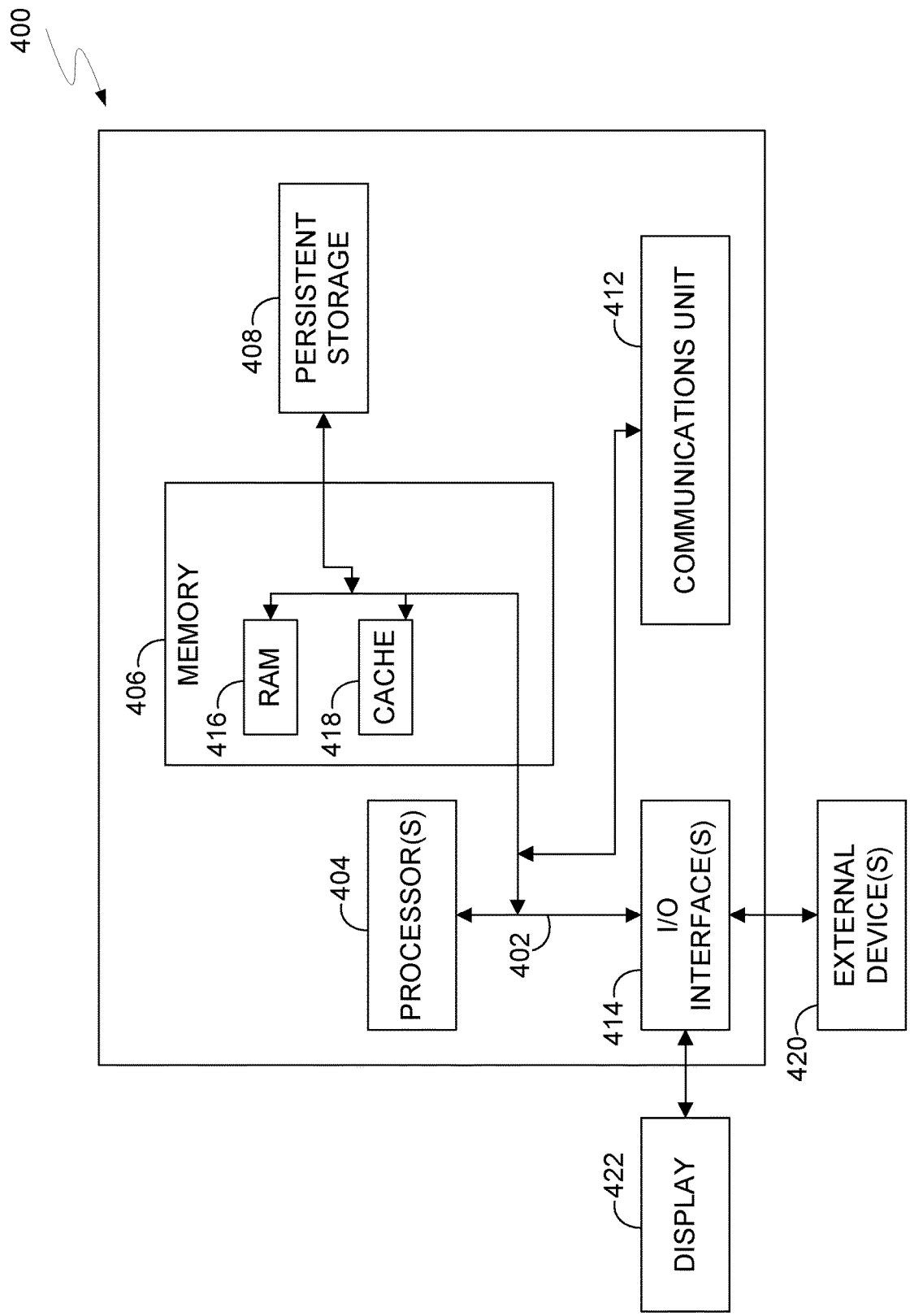
FIG. 4 is a block diagram depicting components of a computer, generally designated 400, suitable for executing a pagination program 101 in accordance with at least one embodiment of the invention.

FIG. 4 is a block diagram depicting components of a computing device, generally designated 400, suitable for executing pagination program 101 in accordance with at least one embodiment of the invention. Computing device 400 includes one or more processor(s) 404 (including one or more computer processors), communications fabric 402, memory 406 including, RAM 416 and cache 418, persistent storage 408, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for pagination program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414.

I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
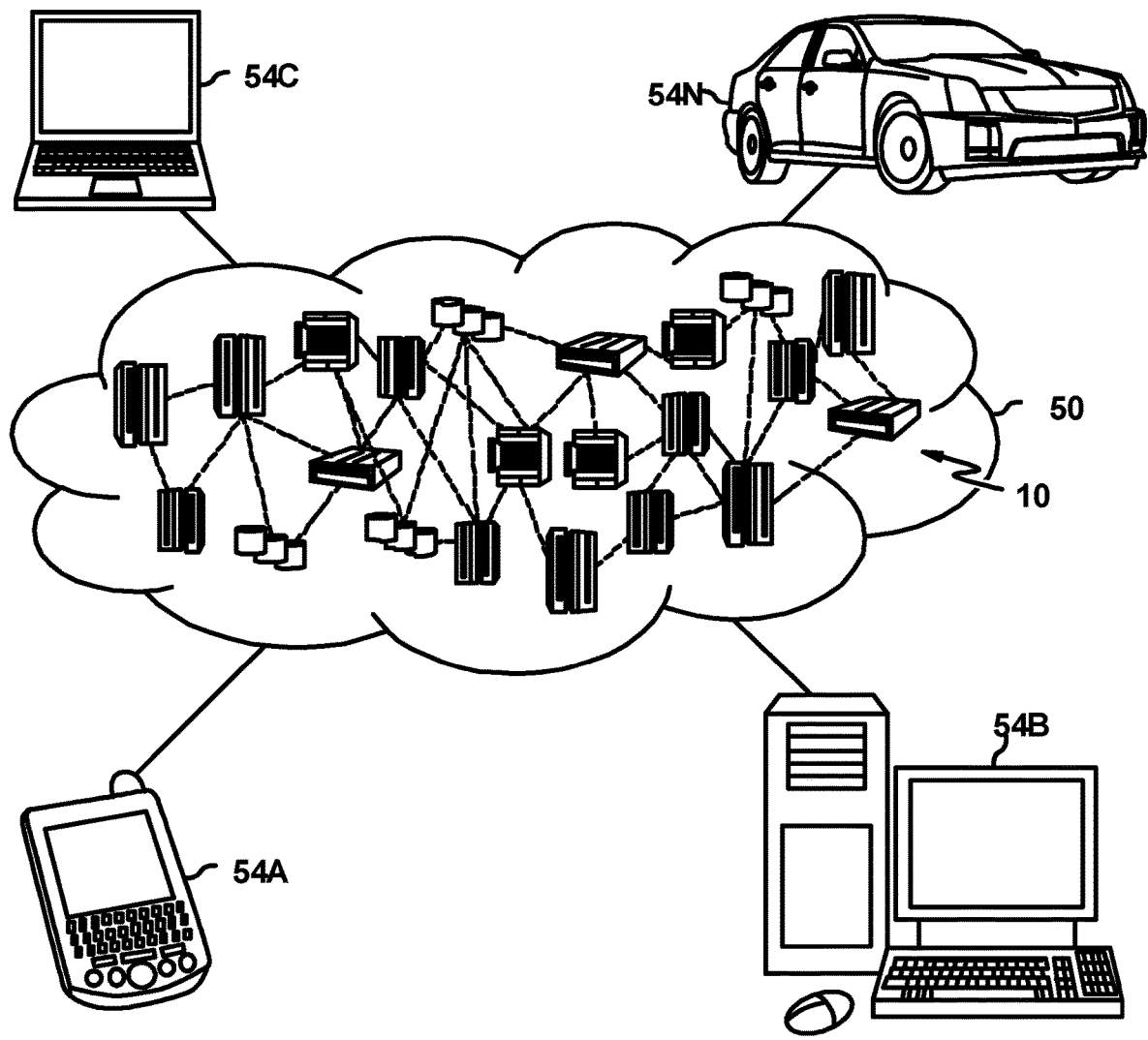
FIG. 5 is a block diagram depicting a cloud computing environment in accordance with at least one embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
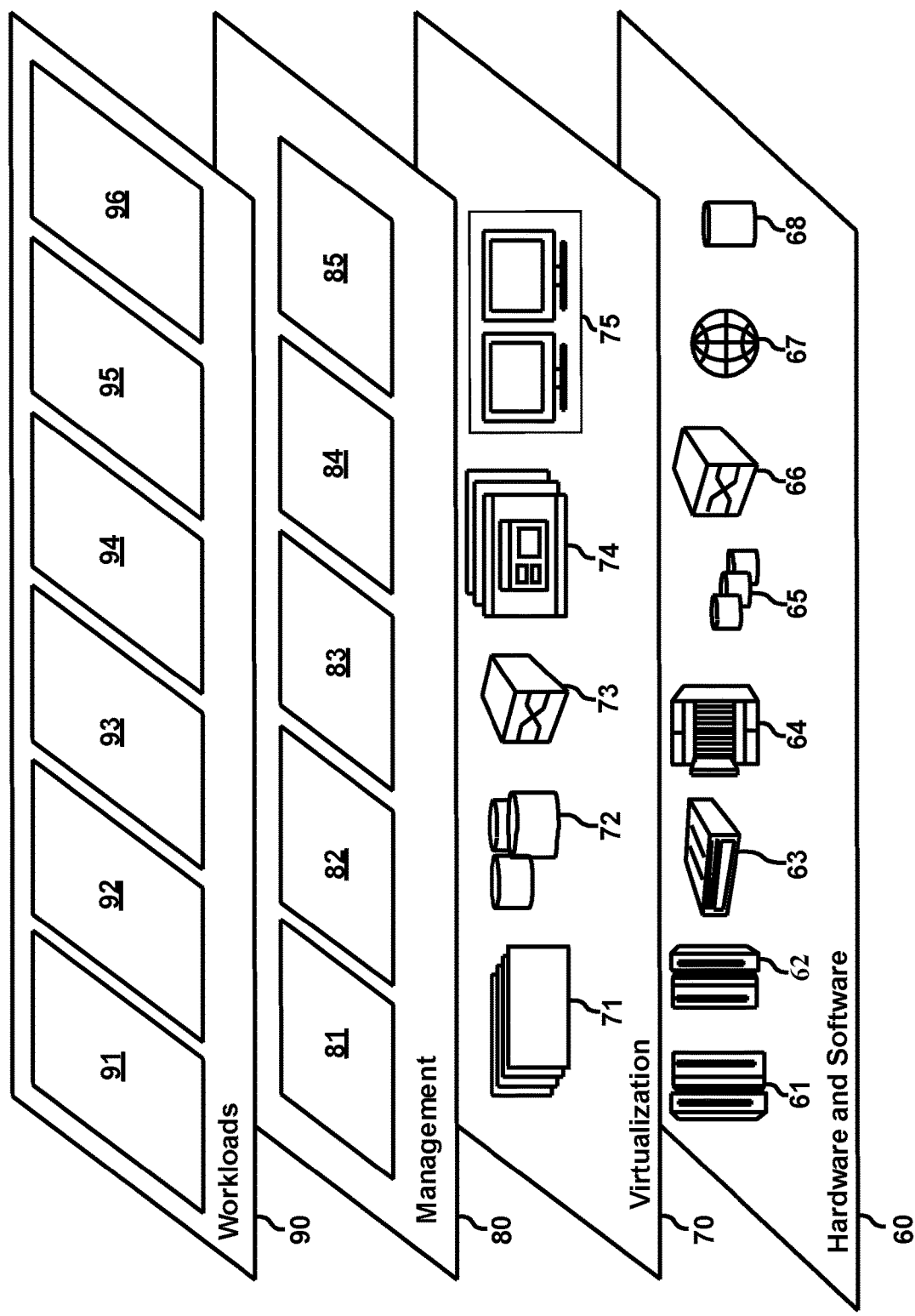
FIG. 6 is block diagram depicting abstraction model layers in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and graphical user interface element accessibility 96.

What is claimed is:

1. A computer-implemented method for graphical user interface element accessibility, comprising:
    generating a graphical user interface element rendered on a web page as a virtual button displayed on a display screen of a device, wherein the virtual button includes an invocable function mapped to the graphical user interface element, and further wherein the virtual button is not rendered on the webpage; and
    moving the virtual button along a periphery of the display screen of the device, wherein a rate at which the virtual button moves along the periphery of the display screen of the device is dynamically modified based on a detected identity of a user of the device.

2. The computer-implemented method of claim 1, wherein generating the graphical user interface element rendered on the web page as the virtual button displayed on the display screen of the device further comprises:
    identifying a hyperlink associated with the graphical user interface element; and
    adding the hyperlink associated with the graphical element to the virtual button.

3. The computer-implemented method of claim 1, wherein the invocable function is invoked in response to a user selection of the virtual button, and wherein the invocable function is a selection of the graphical user interface element mapped to the virtual button.

4. The computer-implemented method of claim 1, wherein generating the graphical user interface element rendered on the web page as the virtual button displayed on the display screen of the device is in response to:
  detecting a touch event within a predetermined area of the graphical user interface element rendered on the web page for at least a predetermined period of time.

5. The computer-implemented method of claim 1, wherein generating the graphical user interface element rendered on the web page as the virtual button displayed on the display screen of the device is in response to:
  detecting a touch event on a portion of the graphical user interface element for at least a predetermined period of time.

6. The computer-implemented method of claim 1, wherein generating the graphical user interface element rendered on the web page as the virtual button displayed on the display screen of the device is in response to:
  identifying the graphical user interface element rendered on the web page.

7. The computer-implemented method of claim 1, wherein generating the graphical user interface element rendered on the web page as the virtual button displayed on the display screen of the device is in response to:
  the web page having the graphical user interface element rendered on the web page being loaded on a web browser above a predetermined threshold amount of time.

8. The computer-implemented method of claim 1, wherein moving the virtual button along the periphery of the display screen of the device includes:
  continuously circulating the virtual button about the periphery of the display screen of the device.

9. The computer-implemented method of claim 1, wherein moving the virtual button along the periphery of the display screen of the device includes:
  intermittently circulating the virtual button about the periphery of the display screen of the device.

10. A computer-implemented method for graphical user interface element accessibility, comprising:
  generating a graphical user interface element rendered on a web page as a virtual button displayed on a display screen of a device, wherein the virtual button includes an invocable function mapped to the graphical user interface element, and further wherein the virtual button is not rendered on the webpage; and
  moving the virtual button along a periphery of the display screen of the device, wherein a rate at which the virtual button moves along the periphery of the display screen of the device for a particular user is learned over time.

11. The computer-implemented method of claim 10, wherein generating the graphical user interface element rendered on the web page as the virtual button displayed on the display screen of the device further comprises:
  identifying a hyperlink associated with the graphical user interface element; and
  adding the hyperlink associated with the graphical element to the virtual button.

12. The computer-implemented method of claim 10, wherein the invocable function is invoked in response to a user selection of the virtual button, and wherein the invocable function is a selection of the graphical user interface element mapped to the virtual button.

13. The computer-implemented method of claim 10, wherein generating the graphical user interface element rendered on the web page as the virtual button displayed on the display screen of the device is in response to:
  identifying the graphical user interface element rendered on the web page.

14. The computer-implemented method of claim 10, wherein moving the virtual button along the periphery of the display screen of the device includes:
  continuously circulating the virtual button about the periphery of the display screen of the device.

15. The computer-implemented method of claim 10, wherein moving the virtual button along the periphery of the display screen of the device includes:
  intermittently circulating the virtual button about the periphery of the display screen of the device.

16. A computer-implemented method for graphical user interface element accessibility, comprising:
  generating a graphical user interface element rendered on a web page as a virtual button displayed on a display screen of a device, wherein the virtual button includes an invocable function mapped to the graphical user interface element, and further wherein the virtual button is not rendered on the webpage; and
  moving the virtual button along a periphery of the display screen of the device, wherein a direction of circulation of the virtual button along the periphery of the display screen of the device is determined based on at least one of a style in which a user holds the device, and a hand in which the user holds the device.

17. The computer-implemented method of claim 16, wherein generating the graphical user interface element rendered on the web page as the virtual button displayed on the display screen of the device further comprises:
  identifying a hyperlink associated with the graphical user interface element; and
  adding the hyperlink associated with the graphical element to the virtual button.

18. The computer-implemented method of claim 16, wherein the invocable function is invoked in response to a user selection of the virtual button, and wherein the invocable function is a selection of the graphical user interface element mapped to the virtual button.

19. The computer-implemented method of claim 16, wherein moving the virtual button along the periphery of the display screen of the device includes:
  continuously circulating the virtual button about the periphery of the display screen of the device.

20. The computer-implemented method of claim 16, wherein moving the virtual button along the periphery of the display screen of the device includes:
  intermittently circulating the virtual button about the periphery of the display screen of the device.

* * * * *